Figure 4:
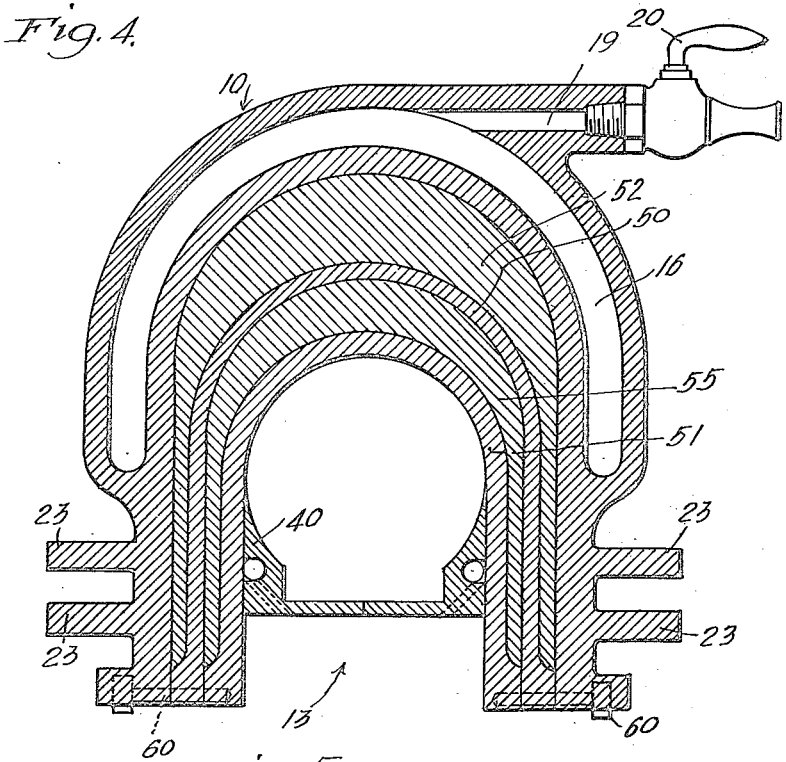

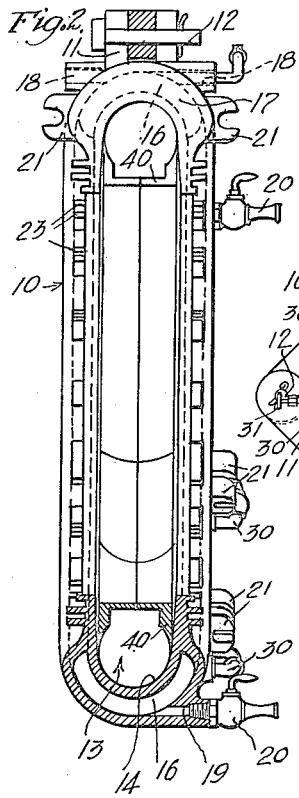

M. T. BARNEY.
TIRE MOLD.
APPLICATION FILED JAN. 26, 1921.

1,429,831.

Patented Sept. 19, 1922.
2 SHEETS—SHEET 2.

Inventor:
Michael T. Barney
By James T. Barlow
his Attorney

Patented Sept. 19, 1922.

1,429,831

UNITED STATES PATENT OFFICE.

MICHAEL T. BARNEY, OF LOS ANGELES, CALIFORNIA.

TIRE MOLD.

Application filed January 26, 1921. Serial No. 440,014.

*To all whom it may concern:*

Be it known that I, MICHAEL T. BARNEY, a subject of Great Britain, residing in Los Angeles, county of Los Angeles, State of California, have invented new and useful Improvements in Tire Molds, of which the following is a specification.

This invention has to do with a tire mold, and it is an object of the invention to provide a device of this character which is simple and effective and which may be used to vulcanize or cure various sized tire casings, and various sized sections of the tire casing or whole tire casings.

With any vulcanizing apparatus heretofore used or proposed it is possible to vulcanize only a certain amount of a tire casing. That is, one apparatus may be adapted to vulcanize a whole casing but it cannot be used to vulcanize only a portion of a casing, while another apparatus may be used to vulcanize a portion of a casing but cannot be used to vulcanize a smaller or larger portion or the whole of a casing. With the last mentioned apparatus it is possible to vulcanize the whole of the tire casing by vulcanizing a portion of it at a time until all portions have been treated. This manner of operation is not only inefficient and inconvenient but often times causes portions of the casing to be overcured.

The apparatus provided by this invention can be used to vulcanize either the whole of a tire casing simultaneously, or various sized portions of the casing. It is to be understood that, by referring to a tire, or tire casing, and to vulcanizing a section or tread on a tire casing, I do not limit or restrict the apparatus specifically to the treatment of any particular device or manufacture, or to performing any specific operation of any particular device or manufacture. The invention is particularly adapted for use in retreading or repairing tire casings, although it may be used to perform similar operations on devices of the same general character as tire casings.

A particular object of the invention is to provide an apparatus which can be used effectively and efficiently to vulcanize or retread the whole of a tire casing in one operation or various sized portions of a tire casing, and thus make it unnecessary for a person engaged in repairing and retreading tire casings to be equipped with numerous sizes and types of apparatus.

A noteworthy feature of the invention is the provision of a sectional mold in which the several sections are of different sizes, are capable of being arranged together to form a mold for a whole tire, and which are capable of being used independently, one at a time or simultaneously.

Another feature of the invention is the extreme simplicity and compactness of the apparatus. This feature makes the apparatus extremely easy and convenient of manipulation and also simple and inexpensive of manufacture.

Another important feature of the invention is the provision of simple and effective means for adapting the apparatus to various sized tire casings. This eliminates the necessity of being equipped with several apparatus in order to repair or retread tires of various sizes.

The various objects and features of the invention will be best and more fully understood from the following detailed description of a preferred form of the invention throughout which reference is had to the accompanying drawings in which—

Figure 5:
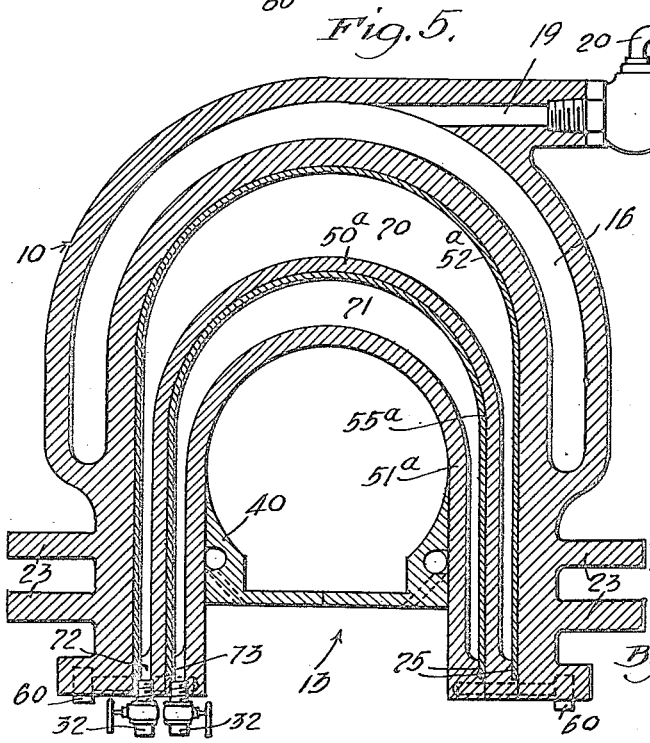
Figure 6:
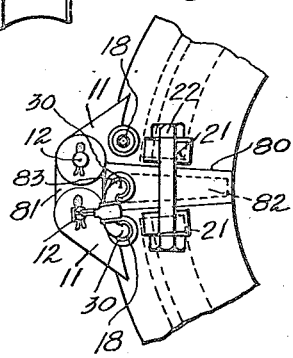

Fig. 1 is a side elevation of the device of the present invention showing it in position to cure a whole tire casing in one heating; Fig. 2 is a vertical section of the same, being a view taken as indicated by line 2—2 on Fig. 1; Fig. 3 is a view similar to Fig. 1 showing the apparatus in an opened out position where it can be used to treat only a portion of a tire casing; Fig. 4 is an enlarged detailed sectional view taken as indicated by line 4—4 on Fig. 1 showing a form of liner which may be used to reduce the size of the apparatus for the treatment of small sized tires; Fig. 5 is a sectional view similar to Fig. 4, showing another form of liner which may be employed in place of that shown in Fig. 4 and Fig. 6 is a fragmentary view showing the manner provided by the invention for increasing the size of the apparatus.

Throughout the drawings numeral 10 designates mold sections formed at their ends with lugs or projections 11 adapted to receive connecting pins 12. The projections 11, it will be noted, are at the outer sides or parts of the mold sections 10, and are so arranged that those at the adjacent ends of adjacent mold sections mesh or fit together so that when the pins 12 are arranged through them the mold sections are hinged together. It is preferred that the lugs 11 be formed so that the mold sections 10 may be easily separated when the pins 12 are removed and, further, so that they will readily fit together when it is desired to connect the mold section.

Each of the mold sections 10 being of the same design and construction, I will proceed to describe only one of them in detail. Each mold section 10 is curved and is formed at its inner side with a cavity or recess 13 the configuration of the inner or bottom portion 14 of which conforms with the outline of the tread portion of a tire casing. The side walls of the cavity 13 are straight and substantially parallel as will be clearly seen from inspection of the drawing. The recess 13 is of uniform size and shape throughout the entire length of the mold section, opens inwardly or toward the center about which the mold section is curved, and is open ended. An opening or chamber 16 is formed in the mold section around the bottom or inner portion 14 of the cavity 13 and to extend the entire length of the mold section. The ends of the chamber 16 are closed by end walls 17. At the ends of the chamber 16 there are openings 18 adapted to admit of circulating steam, or the like, through the chamber 16, as will be hereinafter described. At the middle portion of the chamber 16 there is an opening 19 controlled by a pet-cock 20. At the sides of the mold section and adjacent each end thereof there are notched lugs 21 adapted to receive or carry clamping bolts 22. Along both sides of the mold section and at the inner periphery thereof there are a plurality of lugs 23 adapted to hold suitable clamping devices when it is necessary to hold or clamp bead plates, etc., in the cavity. It will be understood, of course, that the lugs 23 may be of any suitable form and may be arranged in any suitable manner without in any way affecting the spirit of this invention.

From inspection of Fig. 1 of the drawings it will be noted that all of the mold sections 10 are of the same curvature and that they can be placed together to form a complete circular mold. The cavities 13 in the several mold sections being open ended form a continuous cavity or opening to carry a tire casing. It will be particularly noted that the mold sections are all of different sizes and that there is a very considerable difference in size between the smallest one and the largest one. When the several mold sections are arranged, as in Fig. 1 of the drawings, to form a continuous circular mold they will be positively and solidly held in this arrangement if all adjacent mold sections are connected by pins 12. When the mold sections are held or secured in circular formation by the pins 12 they may be very easily and quickly released from that position and opened out in any desired manner by removing any one of the pins 12. That is, if the mold sections are in circular formation and are held in that position by the pins 12, releasement or removal of one of the pins will allow swinging or movement of adjacent mold sections one relative to the other.

When the mold sections 10 are arranged in circular formation, as above described, a flexible conductor or pipe 30, having in it a stop or control valve 31, has one end connected with the opening 18 at one end of one of the mold sections 10 and its other end connected to a steam supply pipe 32. The opening 18 at the other end of said mold section is connected with the opening 18 in the adjacent end of the next mold section by a pipe 30 having in it a stop valve
31. In this manner the chambers 16 of the two mold sections are connected so that steam supplied into the chamber 16 of the first mold section passes therethrough and into the chamber 16 of the second mold section. The several mold sections forming the circular mold are connected by pipes 30, provided with stop valves 31, so that steam from the supply pipe 32 can pass completely around the mold through the various chambers 16 to the chamber of the mold section adjacent to the end of the first mentioned mold section into which the steam was initially admitted. The opening 18 adjacent the one through which the steam is admitted is connected with a discharge or outlet pipe 34 in which there is a suitable check valve 35. With the arrangement just described, and which is clearly illustrated in Fig. 1 of the drawings, there is a pipe 30 with a stop valve 31 to connect adjacent mold sections. It will be obvious, of course, that the supply pipe 32 and discharge pipe 34 may be arranged in connection with any two adjacent mold sections to circulate steam completely around and through the mold and need not be connected to the particular mold sections illustrated in the drawings. With the arrangement above set forth the mold may be opened, that is, the several sections may be opened out to a position such as is shown in Fig. 3 of the drawings, without breaking any of the above mentioned steam connections when the pin 12, connecting the sections into which the supply pipe 32 and discharge pipe 34 connect, is removed. It will be readily understood how the pipes 30 being flexible allow the mold sections to be freely moved or swung relative to each other. Further, with the apparatus so far described the mold can be conveniently arranged so that steam is supplied only to a portion of it. For instance, steam may be passed through only one of the mold sections by connecting the supply pipe 32 to the opening 18 at one end of said section and the discharge pipe 34 to the opening 18 at the other end of said section. The particular number and arrangement of steam connections (pipes 30) herein set forth is merely typical of that which may be employed and in no way limits the invention to any specific arrangement of this kind. For instance it may be advantageous in certain apparatus to provide 18 at both sides of each end of each mold section to permit of conveniently connecting the spacers hereinafter described.

From inspection of Fig. 3 of the drawings it will be readily seen how steam may be circulated through any desired portion of the mold even when it is not arranged in the particular manner shown in Fig. 1. In the particular case illustrated in Fig. 3 the mold sections are shown partially opened out and one of the mold sections is shown with the supply pipe 32 connected to the opening 18 at one end and discharge pipe 34 connected with the opening 18 at the other end. With this particular arrangement steam is circulated only through that section which is connected with supply pipe 32 and the discharge pipe 34. It will be obvious, of course, how the supply and discharge pipes may be connected with any one mold section, or any desired group of mold sections, whether the mold sections are arranged in circular formation, as shown in Fig. 1, or whether they are opened out in a manner such as is shown in Fig. 3. Further, it may be stated that several, or in fact any desired number, of the mold sections can be independently supplied with steam by connecting independent supply pipes and discharge pipes to them in the manner above described in the case of one mold section.

I will now describe, generally, the manner of operation in the case of completely retreading a tire casing. The mold sections are opened out to a position where the casing, bead plates, etc., can be arranged within them. They are then brought together to form a circular mold as shown in Fig. 1. By this last mentioned operation the tire casing is confined in the cavity of the mold and is in condition to be vulcanized or cured. When the mold sections have been locked in circular formation by the pins 12 steam is admitted into the chambers 16 of the mold from the supply pipe 32 by opening the valve 31 in the pipe 30 which connects to the supply pipe 32. The steam circulates through the several chambers of the mold sections and finally discharges through the discharge pipe 34. The steam in circulating through the chambers 16 heats the mold and particularly that portion of the mold at the tread portion of the tire casing causing the rubber of the tire casing to be properly cured. The bead plates 40 conducts the heat from the side portions of the mold to the side portions of the casing and thus causes the rubber of the tire casing to be vulcanized to the bead portion of the casing. In practice I prefer to form the bead plates 40 of a material which will readily absorb and conduct heat, say, for instance, aluminum or a suitable alloy. During the curing of the casing the lowermost pet-cocks 20 can be opened occasionally to drain any condensed steam that may have accumulated in the lower portion of the mold. By the provision of pet-cocks in all of the mold sections there is always a pet-cock at the bottom portion of the mold no matter how it may be positioned. When the steam has been circulated through the mold for a sufficient length of time to propely cure the rubber of the casing the stop valve 31, controlling the admission of steam, is closed whereupon the mold will immediately begin to cool and will soon be in condition to permit of removing the pin 12 between the mold sections having connection with the supply and discharge pipes thus allowing the sections to be opened out and the casing removed. In following this course of procedure the whole tire is completely and properly vulcanized by a single heating or curing. Further, the rubber of the casing is uniformly and properly cured throughout and has no soft or spongy spots.

When it is desired to retread or patch a section or portion of a casing a mold section 10 of the proper length, or a combination of mold sections of the proper length, is connected with the supply pipe 32 and discharge pipe 34 in the manner hereinbefore described, the casing, bead plates, etc., are arranged in the section, or sections as the case may be, and properly secured in any suitable manner by any suitable form of clamp or clamps. Steam is then allowed to circulate through the chamber 16 in the manner hereinabove described. It may be stated, however, that when two or more mold sections are arranged in combination to form the proper length of mold that the adjacent sections are positively clamped or held together by arranging the clamping bolts 22 in the lugs of adjacent sections. The lugs 21 being notched, as clearly shown in the drawings, permit of the clamping bolts 22 being very easily placed in and removed from them. When clamping bolts are in place and properly tightened the mold sections are positively and solidly held together and thus form a continuous mold which is practically solid. It will be understood, of course, how condensed steam may be drained from any section, or any combination of sections, by opening the proper petcock.

In Fig. 4 of the drawings I show a cross section of one of the mold sections with two shells 50 and 51 arranged in it. The shells are adapted to be used when it is desired to treat tire casings smaller than are adapted to be treated by the mold sections as hereinabove described. The shell 50 is the largest of the two shells and is adapted to be used when treating or curing a medium sized tire casing. The shell 50 does not seat tightly against the surface of the cavity 13 it being spaced therefrom by a filler 52 of effective heat conducting metal or material arranged between the shell 50 and the mold section proper. With this arrangement heat from the steam circulating through the chamber 16 is transferred to the casing arranged within the shell 50. It will be obvious how a tire casing, bead plates, etc., can be arranged in the tire 50 in substantially the manner that a tire casing, bead plates, etc., are arranged in an ordinary mold. In practice I prefer to secure the shell 50 in place in the cavity 13 by arranging screws 60 through the sides of the mold section and into the shell, as clearly illustrated in the drawings.

The shell 51 is substantially the same as the shell 50 except that it is somewhat smaller and that it fits within the shell 50 in the same manner that the shell 50 fits within the mold section proper. A suitable filler 55 is arranged between the shell 51 and the shell 50 in the same manner as the filler 52 is arranged between the shell 50 and mold section. The shell 51 is adapted to be used when treating small tire casings. It will be obvious how heat from the steam circulated through the chamber 16 will be conducted through the fillers and the shells to the casing within the shell 51. It will be understood, of course, that shells may be provided for each of the mold sections so that they may be used to cure or treat a whole tire casing or any portion of a tire casing. Further, it will be obvious how various numbers or sizes of shells may be provided to fit within the mold sections in order to accommodate various sizes of tire casings. I have merely shown two shells arranged within a mold section to illustrate the manner in which various sized tires may be accommodated.

In the form of the invention illustrated in Fig. 5 the shells 50ª and 51ª are provided with casings or jackets 52ª and 55ª forming spaces or chambers 70 and 71 around the shells 50ª and 51ª respectively. The casing 52ª of shell 50ª fits or seats against the mold section while the casing 55ª of shell 51ª seats against the shell 50ª. Suitable openings 72 and 73 may be provided in communication with the spaces 70 and 71 respectively, so that steam can be supplied to said spaces from steam supply pipes 32. The casings may be welded or otherwise secured to the shells at 75 so that the chambers 70 and 71 are tight and will hold steam. With this form of construction the shell 50ª may alone be heated when a tire casing is being cured in it, and, likewise, the shell 51ª alone may be heated when a tire casing is being secured in it. This construction is advantageous as it makes it unnecessary to heat an excess or unnecessary amount of metal or material when curing various sized tires. In other words, more effective operation is had by directly heating the parts in which the tire casing is carried than is had by heating said part indirectly through shells and fillers.

When it is desired to treat a tire casing which is larger than can be treated by the apparatus hereinabove set forth spacers 80 may be arranged between the mold sections 10 as illustrated in Fig. 6. Each spacer may be formed or provided with a lug 81 by which it may be connected to the mold sections by means of pins 12. Further, each spacer may be formed with a steam chamber 82, and openings 83 may be formed in the sides of the spacer to permit of circulating steam through the chamber 82. In practice the pipe 30 at one side of the mold sections may be connected to one of the openings 83 and a discharge pipe may be connected to the other. It will be obvious how spaces of various sizes may be provided and how any desired number or arrangements of spacers may be used. When very small spacers are used they may be held in place by clamping the mold sections against them by the clamp bolts 22.

It may be stated that the general method of operating the present apparatus is substantially the same as that commonly followed, and that the tire casings may be clamped and inflated, etc., in the usual manner. The casings may be advantageously held out or in place by suitable air bags.

Having described only a preferred form of my invention I do not wish to limit myself to the particular details hereinabove set forth but wish to reserve to myself any changes or variations that may appear to those skilled in the art or that may fall within the scope of the following claims.

Having described a preferred form of my invention, I claim:

1. A tire mold comprising a plurality of sections operable independently or in combination and capable of being arranged in various combinations, means for detachably pivotally connecting adjacent sections, and means independent of said first mentioned means for releasably clamping adjacent sections together.

2. A tire mold comprising a plurality of independently operable sections of different lengths each having a space to carry a heating fluid, and means for detachably connecting the spaces of the sections so that fluid can be supplied to any one or several of them, said means comprising detachable conducts adapted to interconnect said spaces or to connect said spaces with fluid supply conducts.

3. A tire mold comprising a plurality of independent sections operable independently or in combination, projections at the ends of the sections, and pins adapted to be removably arranged in connection with the projections of adjacent sections to detachably pivotally connect adjacent sections.

4. A circular tire mold comprising a plurality of separable sections of different lengths and adapted to be arranged in various combinations, and means for increasing the size of said mold.

5. A circular tire mold comprising a plurality of sections, and spacers adapted to be arranged between the sections to increase the size of the mold.

6. A tire mold comprising a plurality of separable sections operable independently or in combination, and a plurality of shells of different sizes adapted to be arranged one within the other and in the sections to decrease the size of the mold.

7. A tire mold comprising a plurality of separable sections of different lengths and operable independently or in combination, and a shell adapted to be arranged in each section, to decrease the size of the mold.

8. A complete circular tire mold comprising a plurality of independent sections of various lengths and each having a space to carry heating fluid, projections at the ends of the sections, pins adapted to be arranged in connection with the projections of adjacent sections to detachably pivotally connect adjacent sections, said sections being adapted to be arranged in various combinations, flexible detachable conducts adapted to interconnect said spaces or to connect said spaces with fluid conducts, spacers adapted to be arranged between adjacent sections to increase the size of the mold, releasable means for clamping adjacent sections together whether or not the spacers are between them, and a shell adapted to be arranged in each section, to decrease the size of the mold.

9. A tire mold comprising a plurality of independently operable sections of different lengths adapted to be used separately or in combination to form molds of various lengths or a complete circular mold.

10. A tire mold comprising a plurality of separable sections of different lengths, each section having a space for carrying heating fluid, means for connecting the sections together to form molds of various lengths or a complete circular mold, and means for interconnecting the spaces of the sections so that heating fluid may pass between the sections throughout the mold.

11. A tire mold comprising a plurality of separable sections of different lengths, each section having a space for carrying heating fluid, means for connecting the sections together to form molds of various lengths or a complete circular mold, and fluid conducts adapted to detachably connect with the spaces of the sections so that heating fluid may pass between the sections throughout the mold.

12. A shell adapted to be arranged in a tire mold to decrease its size, the shell having a space adapted to carry heating fluid to heat the shell.

13. A tire mold comprising a plurality of separable sections operable independently or in combination, and a plurality of shells of different sizes adapted to be arranged one within the other and in the sections to decrease the size of the mold, each shell having a space adapted to carry heating fluid.

14. A tire mold comprising a plurality of separable sections of different lengths and operable independently or in combination, and a shell adapted to be arranged in each section to decrease the size of the mold, each shell having a space adapted to carry heating fluid.

In witness that I claim the foregoing I have hereunto subscribed my name this 15th day of January 1921.

MICHAEL T. BARNEY.

Witness:
   VIRGINIA I. BERINGER.